US007827339B2

(12) United States Patent
Mudusuru et al.

(10) Patent No.: US 7,827,339 B2
(45) Date of Patent: Nov. 2, 2010

(54) SYSTEM MANAGEMENT INTERRUPT INTERFACE WRAPPER

(75) Inventors: Giri P. Mudusuru, Norcross, GA (US); Radhika Vemuru, Duluth, GA (US); Ashraf Javeed, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 11/042,528

(22) Filed: Jan. 25, 2005

(65) Prior Publication Data

US 2006/0168386 A1 Jul. 27, 2006

(51) Int. Cl.
*G06F 13/24* (2006.01)
*G06F 13/32* (2006.01)
*G06F 9/00* (2006.01)

(52) U.S. Cl. .......................... 710/267; 710/260; 711/2; 711/100; 713/2; 714/36; 717/168

(58) Field of Classification Search ................. 710/260, 710/267; 717/168–172
See application file for complete search history.

(56) References Cited

U.S. PATENT DOCUMENTS

| | | | | |
|---|---|---|---|---|
| 5,968,174 A * | 10/1999 | Hughes | .......................... | 713/2 |
| 6,081,664 A * | 6/2000 | Nowlin, Jr. | ................. | 717/127 |
| 6,105,101 A * | 8/2000 | Hester et al. | ................ | 710/260 |
| 6,148,325 A * | 11/2000 | Schmidt et al. | ............. | 718/107 |
| 6,363,409 B1 * | 3/2002 | Hart et al. | ....................... | 718/1 |
| 6,370,606 B1 * | 4/2002 | Bonola | ........................ | 710/260 |
| 6,823,516 B1 * | 11/2004 | Cooper | ........................ | 718/108 |
| 6,954,852 B2 * | 10/2005 | Burokas et al. | ................ | 713/2 |
| 7,093,118 B2 * | 8/2006 | Nalawadi et al. | ............... | 713/2 |
| 7,103,686 B1 * | 9/2006 | Lin et al. | ..................... | 710/100 |
| 7,213,152 B1 * | 5/2007 | Gafken et al. | ............... | 713/187 |
| 7,222,339 B2 * | 5/2007 | Rothman et al. | ........... | 717/168 |
| 7,318,171 B2 * | 1/2008 | Rothman et al. | .............. | 714/25 |
| 2004/0193914 A1 * | 9/2004 | Chih-Wei | .................... | 713/200 |
| 2005/0114639 A1 * | 5/2005 | Zimmer | ...................... | 712/244 |
| 2006/0020844 A1 * | 1/2006 | Gibbons et al. | ................ | 714/2 |
| 2006/0047941 A1 * | 3/2006 | Lai | ................................ | 713/2 |
| 2007/0169076 A1 * | 7/2007 | Desselle et al. | ............ | 717/168 |

OTHER PUBLICATIONS

Intel Corporation entitled, "*Pentium Processor Family Developer's Manual vol. 3: Architecture and Programming Manual (1995)*".

* cited by examiner

*Primary Examiner*—Mark Rinehart
*Assistant Examiner*—Brian T Misiura
(74) *Attorney, Agent, or Firm*—Tim Tingkang Xia; Morris, Manning & Martin, LLP

(57) ABSTRACT

In a personal computing system function calls, formatted in 16-bit format for a 16-bit interface to the firmware, are communicated through an operating system providing a System Management Interrupt (SMI) interface to the firmware. An SMI function call in SMI format is generated and sent to an SMI Interface Wrapper module between the operating system and the firmware. The SMI function call is received over the SMI interface at the SMI Interface Wrapper. In the SMI Interface Wrapper, function data from the SMI function call is extracted to provide function call data. A 16-bit function call with the function call data is generated by the SMI Interface Wrapper and passed to the firmware.

6 Claims, 5 Drawing Sheets

SYSTEM MANAGEMENT INTERRUPT INTERFACE WRAPPER

TECHNICAL FIELD

This invention relates to personal computers and to setting up the firmware program code in such computers. More particularly, the invention relates to the addition of an System Management Interrupt (SMI) Interface Wrapper module to interface between an operating system not supporting a 16-bit interface and 16-bit firmware so that system BIOS applications running on the operating system can customize the firmware.

BACKGROUND OF THE INVENTION

Historically, system BIOS applications and set-up utility functions reside in the firmware, i.e., the BIOS (Binary Input/Output System) and access to this firmware was through a 16-bit interface. As the computer hardware became more sophisticated, 32-bit operating systems began running on top of the firmware.

Today's operating systems generally operate in a 32-bit mode, however, for purposes of backward compatibility and particularly for purposes of system set-up, the operating systems have maintained a 16-bit interface with the firmware. Recently, operating systems, however, have begun to no longer support the 16-bit interface. This creates problems particularly for personal computer manufacturers in setting up their system boards. The problem is that the system set-up applications run on top of the 32 bit operating system but require access to 16-bit runtime interface that reside in the firmware. Accordingly, what is needed is computer architecture and process that permits 16-bit function calls from the system set-up applications to be forwarded to the firmware across a non-16 bit interface between the operating system and the firmware. If there were a 32 bit interface to the firmware, there would be a need to make changes to utility modules. However, changing the utility modules is time consuming, and there is no industry standard for 32-bit interface to the firmware.

SUMMARY OF THE INVENTION

To overcome these problems, System Management Interrupt (SMI) Interface Wrapper has been invented, and it requires minimal changes to the existing Firmware/BIOS. The above and other problems have been solved by providing an SMI Interface Wrapper module between the operating system and firmware. An application set-up module generates a first function call to the SMI interface in an SMI interface format used by the operating system. The System Management Interrupt (SMI) Interface Wrapper module generates a 16-bit function call from the first function call and passes the 16-bit function call to the firmware.

The invention in one aspect is implemented as a method to communicate function calls formatted with a first format for a first interface to the firmware in a computing system through an operating system providing a second interface with a second format to the firmware. The method begins by generating an intermediate function call of a format consistent with the second format. The intermediate function call is received over the second interface at an entry module to the firmware. In the entry module, function data from the intermediate function call is extracted to provide function call data. A first format function call with the function call data is generated and passed into the firmware.

The invention may be implemented as a computer system, a computer process, or as a computer program product. The computer program product or computer readable media may be computer storage media readable by a computer system and encoding a computer program of instructions for executing a computer process. The computer program product may also be a propagating signal on a courier readable by a computing system and encoding a computer program of instructions for executing a computer process.

The great utility of the invention is that it provides for the servicing of 16-bit calls when the operating system does not support 16-bit runtime interface to the firmware.

The above and various other features as well as advantages, which characterize the present invention, will be apparent of the following detailed description and a review of the associated drawings.

DETAILED DESCRIPTION

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
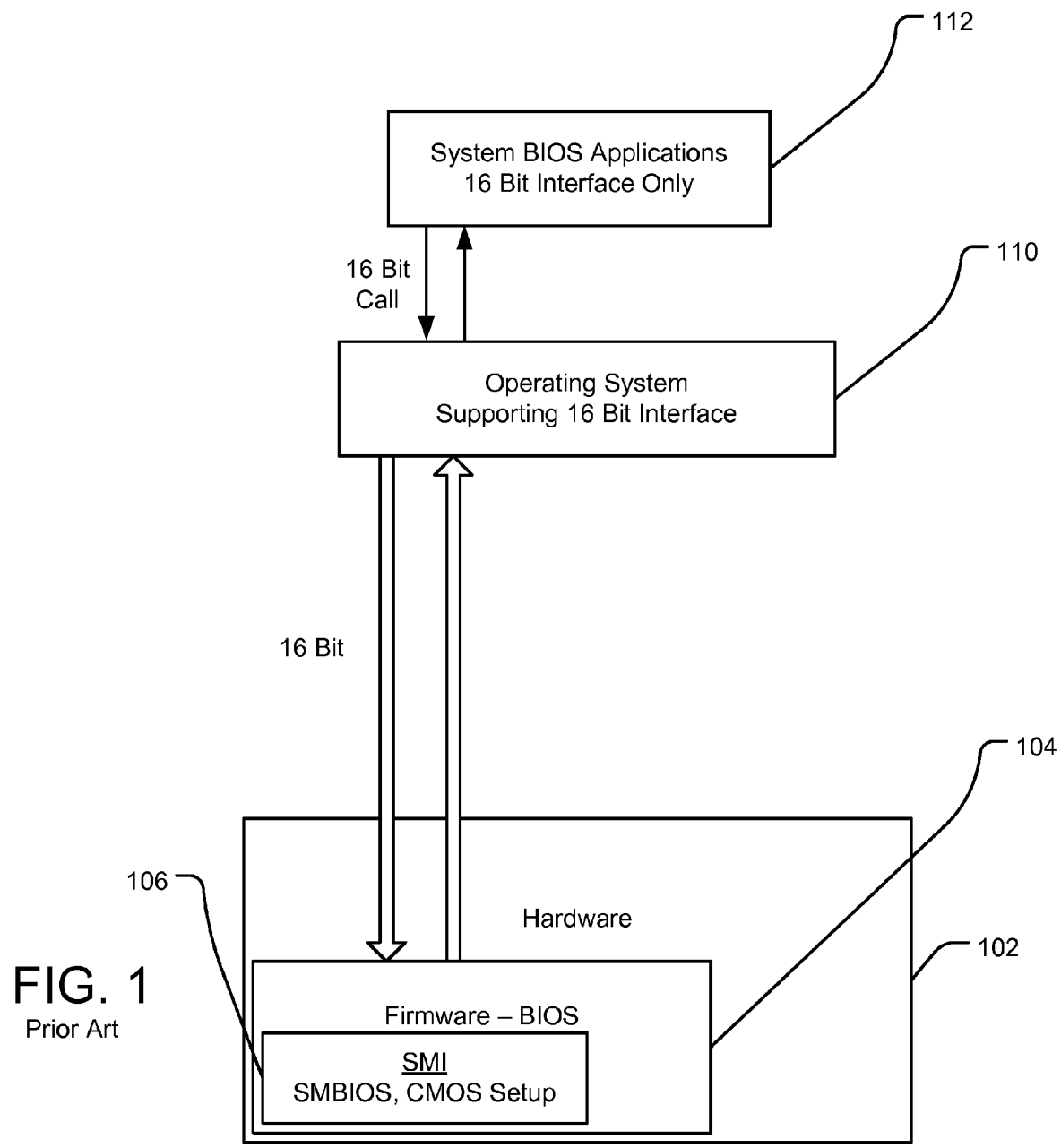
FIG. 1 shows the architecture of a computing system in the prior art where the operating system provides a 16-bit interface with the firmware.

FIG. 1 illustrates the well-known system architecture of a personal computing system. At the lowest level, there is the hardware 102. The hardware 102 contains the system board including the central processing unit, memory and other computing system hardware, particularly the firmware 104. The firmware resides in read only memory and Electrical Erasable Programmable Read-Only Memory (EEPROM). The System Management Interrupt (SMI) programs and data 106 are a part of the firmware. The SMBIOS and CMOS Set-up programs and data are also part of the firmware.

Running on top of the firmware is the operating system, which is typically a 32-bit system 110. As discussed in the background, this 32-bit operating system in FIG. 1 supports a 16-bit interface to the firmware. At the top of the architecture are the application programs—in this particular case the system set-up application programs that call a 16-bit runtime interface in the firmware 106. As stated earlier in the background of the invention, this is the system architecture for personal computing system that existed in the art prior to the invention. The 16-bit interface between the operating system and the firmware was maintained by the operating system 110 so that system set-up applications 112, requiring the 16-bit runtime interface from the firmware, might communicate with the firmware to set-up the firmware.

For example, the BIOS Parameters provided to the personal computing system manufacturer is a binary code file. This code file comes with pre-defined defaults and options for the system hardware. When the manufacturer assembles a given computing system, the manufacturer may alter these standard system configurations and defaults. Accordingly, a system set-up application is provided that can update and adjust the firmware or BIOS code to customize each personal computing system.

When the computer manufacturer builds the system board, an EEPROM containing the standard BIOS code is installed. This is known as firmware.

The first time the computing system is turned on or booted up, the standard BIOS chip loads the operating system 110 and the operating system takes over the operation of the computing system. The system set-up applications 112 then run on top of the operating system 110. In order to change the SMBIOS and CMOS data later, the manufacturer then supplies a system set-up file, which is interpreted by the system set-up application. The application generates 16-bit calls back to the firmware to update or set-up the firmware for the final customized configuration and identification of the computing system. This final update is accomplished by storing the update or set-up data in the EEPROM.

Figure 2:
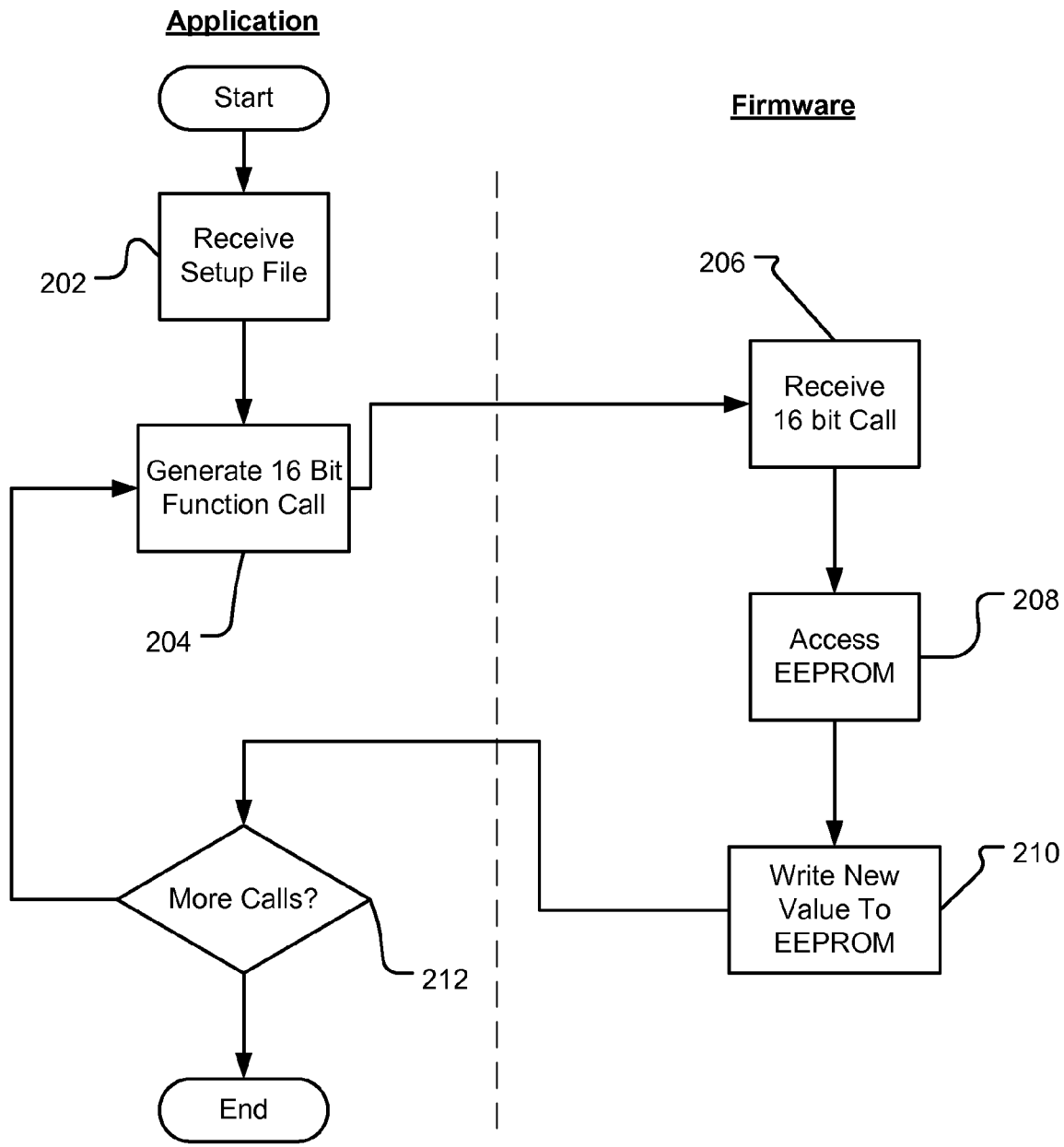
FIG. 2 shows the operational flow in the system set-up application and the firmware to set-up utility functions when a 16-bit interface is provided by the operating system to the firmware as shown in FIG. 1.

FIG. 2 illustrates the operational flow occurring in the applications 112 and the firmware 104. In FIG. 2, the set-up receive operation 202 receives a set-up file from the user setting up the system. This set-up file is used to perform a one time customization, adjustment or set-up of the BIOS Parameters on the personal computer system with its configuration and defaults as manufactured. Generate operation 204 reads the set-up file received by receive operation and generates a function call for a 16 bit utility specified in the set-up file. The call receive operation 206 will receive the function call from the application 112. The function call will identify the function or utility in the firmware to be set or defined and provide set-up data to set the function or update information in the function. Access operation 208 accesses the function in the EEPROM in the firmware. The write operation 210 takes the set-up data in the function call and writes it to the BIOS.

After the new value has been written in the BIOS, the operation flow returns to the more calls test operation 212 to determine if there are more function calls in the set-up file to be processed. If there are more calls, then the operation call returns to the generate operation 204. If there are no more function calls to be processed, then the operation flow ends and the system set-up application is complete.

Figure 3:
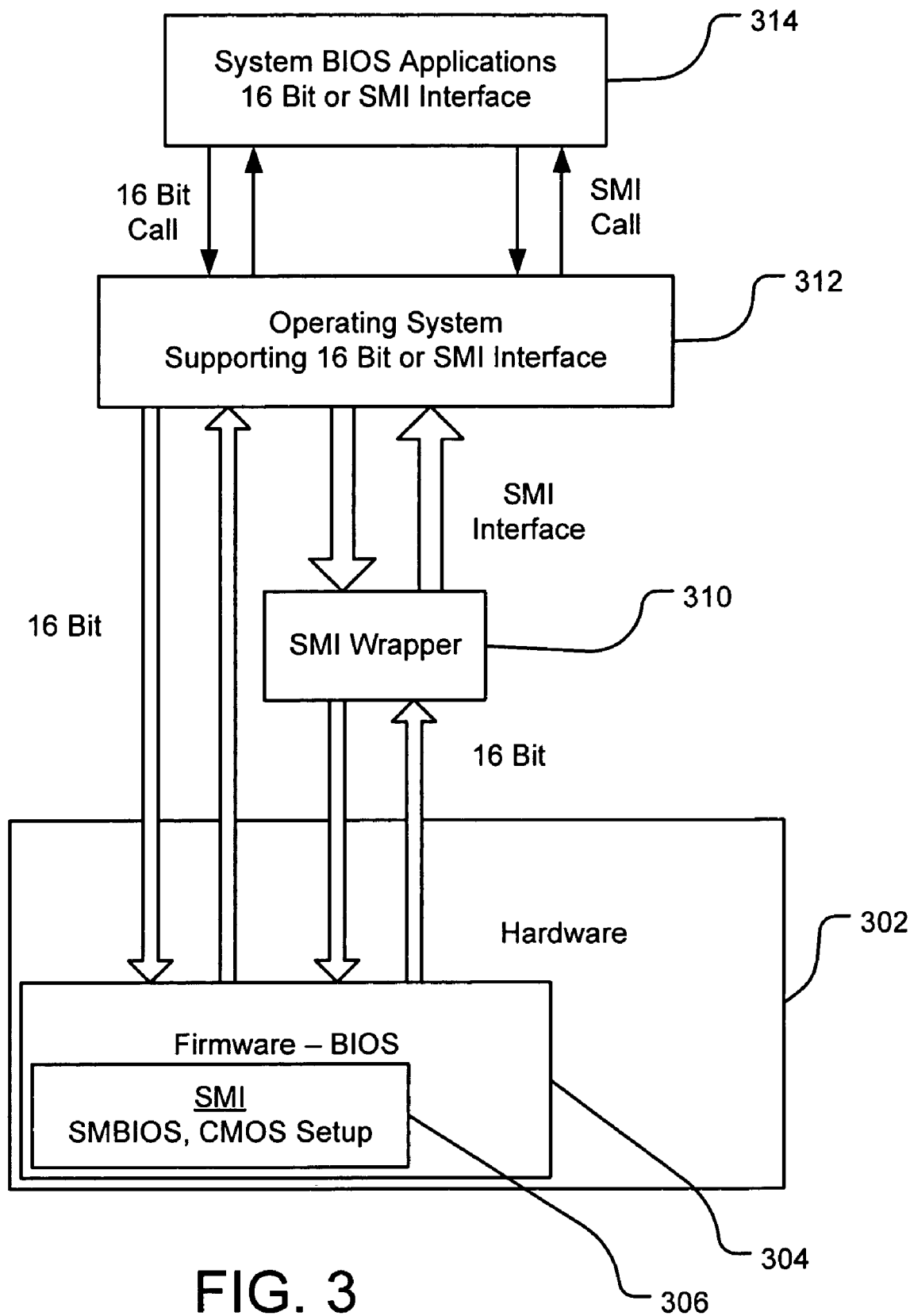
FIG. 3 illustrates the computing system architecture of a preferred embodiment of the invention utilizing an SMI Interface Wrapper module between the operating system and the firmware.

FIG. 3 illustrates a system architecture for accomplishing the system set-up according to a preferred embodiment of the invention where the operating system 312 may support a 16 bit interface to the firmware or may support an SMI interface to the firmware. In the architecture in FIG. 3, an SMI Interface Wrapper module 310 has been added as an entry module to the firmware at the SMI interface. The hardware 302 in the computing system includes the same elements as previously discussed for hardware 102 in FIG. 1. Likewise, the firmware 304 includes the System Management Interrupt programs and data 306 which include the system management BIOS (SMBIOS) and the CMOS set-up programs and data. Running on top of the operating system 312 is the system set-up application 314. The system set-up applications are used to update or adjust the BIOS Parameters in the firmware to change the system configuration and defaults for a given personal computer.

Figure 4:
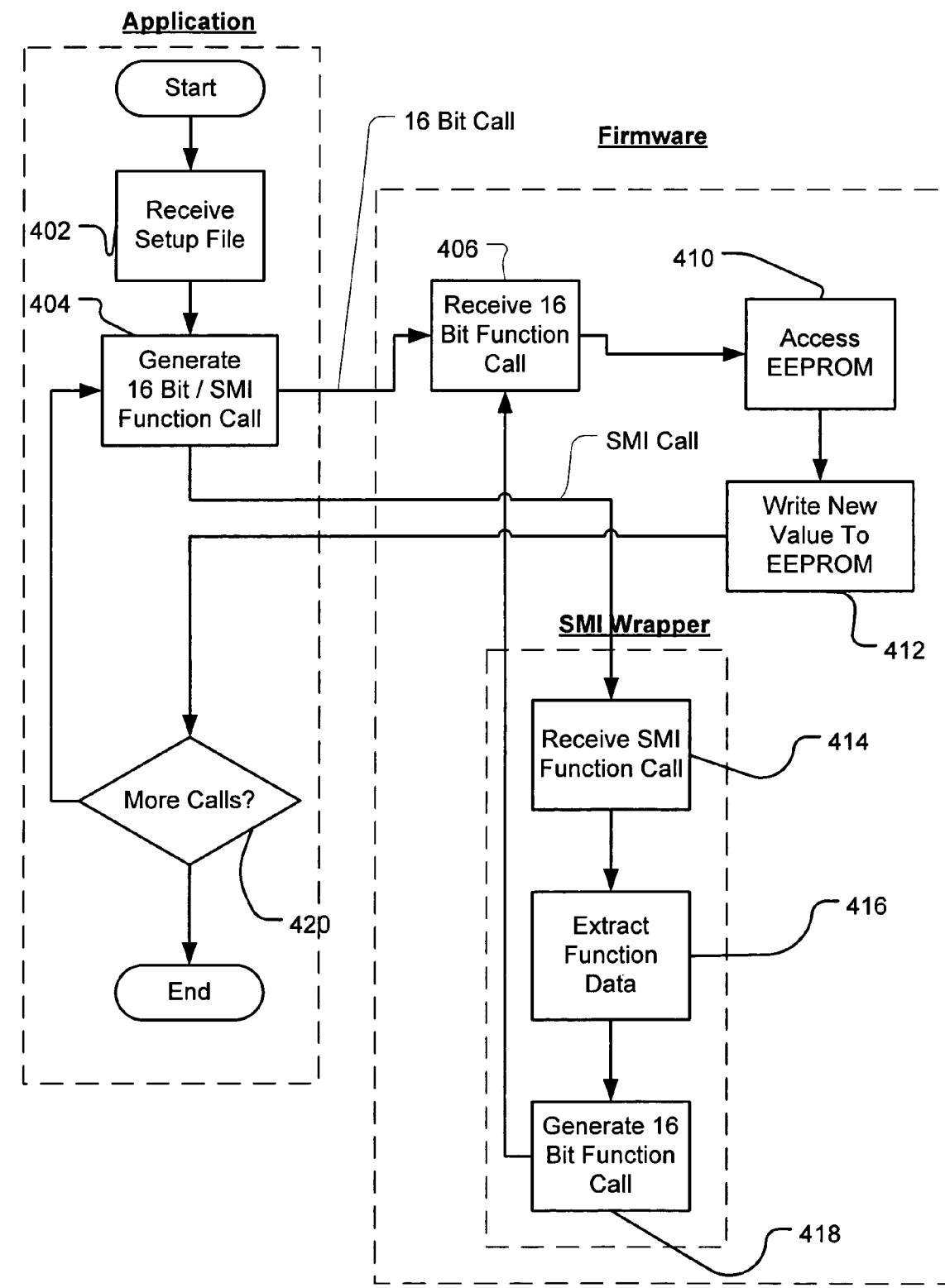
FIG. 4 shows the operational flow in the system set-up application, the SMI Interface Wrapper module, and the firmware as they implement a preferred embodiment of the invention.

If the operating system 312 supports the 16 bit interface, then the function calls from the system BIOS applications 314 are handled in a manner similar to the operational flow described in reference to FIG. 2 and also included in FIG. 4. If the operating system 312 does not support a 16-bit interface to the firmware 206, the function calls will be handled in accordance with embodiments of the present invention in FIGS. 3 and 4. In the latter event the operating System 312 will pass SMI function calls over the SMI interface to the SMI Interface Wrapper 310. The SMI Interface Wrapper 310 converts the SMI function calls received on the SMI interface to a proper format for a 16-bit interface to the firmware and passes them to the firmware 304.

FIG. 4 illustrates the operational flow occurring in the applications 314, the SMI Interface Wrapper 310, and the firmware 304. In FIG. 4, the set-up receive operation 402 receives a set-up file from the personal computer manufacturer. This set-up file is used to do the one time set-up of the BIOS code for the personal computer system board as configured by the manufacturer.

Figure 5:
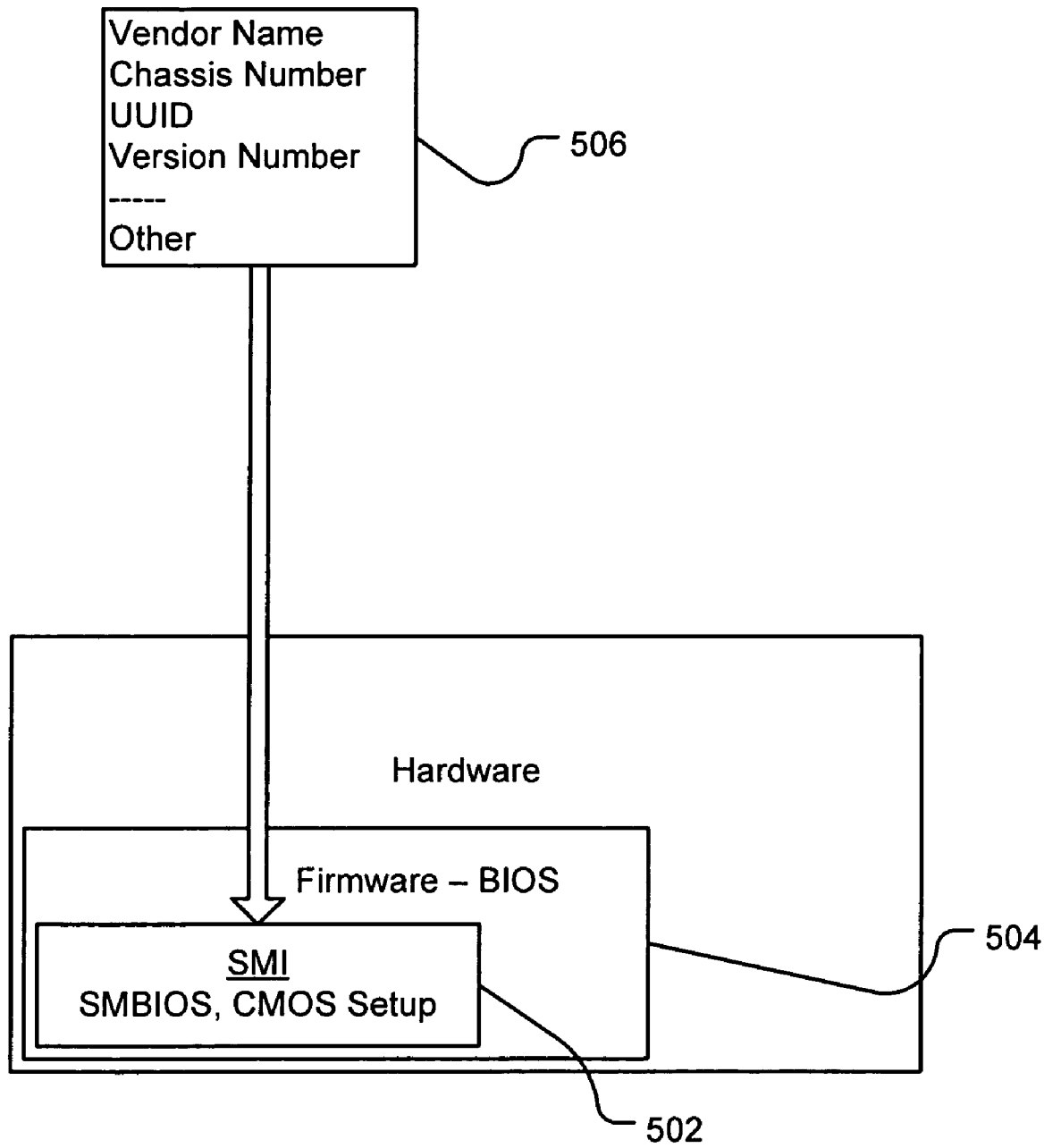
FIG. 5 illustrates one example of a system set-up requiring a 16-bit function call.

For example, as shown in FIG. 5, the BIOS chip on the system board of the computing system will contain the SMI programs and data 502. The manufacturer will wish to update the BIOS in the firmware 504 with data such as shown in Set-Up File 506. This data includes the vendor name, a chassis number for the computing system, the universal unique identification (UUID) for the computing system, the version number of the BIOS, and many other set-up data values that will specify configurations, such as number of drives, or default values or system information. The set-up will occur when the system first boots up during final set-up and test at the manufacturer's plant.

In FIG. 4, the call receive operation 406 in the firmware will receive the function call from the application 314 if the call was for a 16 bit function and the operating system supports a 16-bit interface. The access operation 410 and the write operation 412, then operate to access and write the set-up data into the EEPROM in the same manner as discussed above for access operation 208 and 210 in FIG. 2.

If the function call is an SMI function call, i.e an intermediate function call, then the SMI call receive operation 414 in the SMI Interface Wrapper receives the SMI function call with the set-up data for the function. The SMI function call from the application 314 is received by the SMI Interface Wrapper over the SMI interface. Extract operation 416 extracts the function data associated with the function call. Format operation 418 then formats the SMI function call with its set-up data into proper 16-bit format for a 16-bit function call. The 16-bit function call with set-up data is now passed to call receive operation 406 in the firmware over a 16-bit interface.

Access Operation 410 reads the function call received by call receive operation 406 and accesses the function in the EEPROM. Write operation 412 writes the new value for the set-up data for the function to the BIOS.

After the new value has been written in the EEPROM, the operation flow returns to the more calls test operation 420 to determine if there are more function calls in the set-up file to be processed. If there are more calls, then the operation call returns to the generate operation 404. If there are no more function calls to be processed, then the operation flow ends and the system set-up is complete.

While the invention has been particularly shown and described with reference to preferred embodiments thereof, it will be understood by those skilled in the art that various other changes in the form and details may be made therein without departing from the spirit and scope of the invention.

What is claimed is:

1. In a computing system, a method for calling a 16-bit function of a firmware from an application program running on a 32-bit operating system that provides a system management interrupt (SMI) interface to the firmware, the method comprising:
   generating, by way of the application program, a 32-bit SMI function call comprising an identifier of the 16-bit function of the firmware;
   passing, by way of the SMI interface, the 32-bit SMI function call to an SMI entry module, the SMI entry module executing in a system management mode of the computing system;
   in the SMI entry module, extracting the identifier of the 16-bit function of the firmware from the 32-bit SMI function call; and
   generating in the system management mode a 16-bit format function call to the 16-bit function of the firmware.

2. The method of claim 1, wherein the 32-bit operating system also provides a 16-bit interface to the firmware, and the method further comprises:
   generating a function call formatted in the 16-bit format and passing the 16-bit formatted function call via the 16-bit interface to the firmware and bypassing the SMI interface and the SMI entry module.

3. A computing system apparatus for permitting calls to 16-bit set-up functions of a firmware of the computing system by system set-up applications running on a 32-bit operating system supporting a system management interrupt (SMI) interface, the computing system comprising:
   a system setup application operative to generate a 32-bit SMI function call comprising an identifier of a 16-bit set-up function in the firmware to be called with set-up data to adjust BIOS parameters in the firmware;
   an SMI entry module to the firmware executing in a system management mode of the computing system and operative to receive, by way of the SMI interface, the 32-bit SMI function call, generate in the system management mode a 16-bit format function call to the 16-bit set-up function, and pass the set-up data to the 16-bit set-up function.

4. The computing system of claim 3, wherein the computing system is a personal computing system and the firmware contains a BIOS program.

5. The computing system of claim 3 wherein the SMI entry module further extracts the identifier of the 16-bit set-up function in the firmware and the set-up data from the 32-bit SMI function call to generate the 16-bit function call.

6. A computer-readable medium storing computer-executable instructions that, when executed on a computer running a 32-bit operating system supporting a system management interrupt (SMI) interface, cause the computer to:
   generate, by way of an application program running on the 32-bit operating system, a 32-SMI function call comprising an identifier of a 16-bit set-up function of a firmware of the computer and set-up data to adjust BIOS parameters in the firmware;
   pass, by way of the SMI interface, the 32-bit SMI function call to an SMI entry module, the SMI entry module executing in a system management mode of the computer;
   extract the identifier of the 16-bit set-up function and set-up data from the 32-bit function call; and
   generate in the system management mode a 16-bit function call to the 16-bit set-up function, passing the set-up data to the 16-bit setup function.

* * * * *